(12) United States Patent
Hayes-Roth (10) Patent No.: US 7,552,393 B2
(45) Date of Patent: Jun. 23, 2009

(54) HOOK-UP ASSISTANT

(75) Inventor: Frederick Hayes-Roth, Atherton, CA (US)

(73) Assignee: The Hayes-Roth Family Trust, Atherton, CA (US)

( * ) Notice: Subject to any disclaimer, the term of this patent is extended or adjusted under 35 U.S.C. 154(b) by 1272 days.

(21) Appl. No.: 10/642,398

(22) Filed: Aug. 14, 2003

(65) Prior Publication Data

US 2005/0038690 A1   Feb. 17, 2005

(51) Int. Cl.
*G06F 17/60* (2006.01)

(52) U.S. Cl. ........................ 715/753; 715/963

(58) Field of Classification Search ............... 719/318, 719/319; 715/805, 963, 745, 811, 971, 734–739, 715/717, 719–716, 802; 455/435.1; 379/268; 705/9

See application file for complete search history.

(56) References Cited

U.S. PATENT DOCUMENTS

| | | | | |
|---|---|---|---|---|
| 5,050,077 | A | 9/1991 | Vincent | 364/401 |
| 5,197,000 | A | 3/1993 | Vincent | 364/401 |
| 5,815,566 | A | 9/1998 | Ramot et al. | 379/265 |
| 6,035,278 | A | 3/2000 | Mansour | 705/9 |
| 6,064,977 | A * | 5/2000 | Haverstock et al. | 705/9 |
| 6,345,260 | B1 | 2/2002 | Cummings, Jr. et al. | 705/8 |
| 6,360,172 | B1 | 3/2002 | Burfeind et al. | 702/2 |
| 6,381,580 | B1 | 4/2002 | Levinson | 705/8 |
| 6,505,167 | B1 | 1/2003 | Horvitz et al. | 705/9 |
| 6,574,471 | B1 | 6/2003 | Rydbeck | 455/418 |
| 6,732,080 | B1 * | 5/2004 | Blants | 705/9 |
| 6,735,294 | B2 * | 5/2004 | Creamer et al. | 379/211.02 |
| 6,850,893 | B2 * | 2/2005 | Lipkin et al. | 705/8 |
| 6,978,246 | B1 * | 12/2005 | Ruvolo et al. | 705/8 |
| 7,313,447 | B2 * | 12/2007 | Hsiung et al. | 700/9 |
| 2003/0005056 | A1 * | 1/2003 | Yamamoto et al. | 709/205 |
| 2003/0065544 | A1 * | 4/2003 | Elzinga et al. | 705/8 |
| 2003/0137959 | A1 * | 7/2003 | Nebiker et al. | 370/338 |
| 2003/0174826 | A1 * | 9/2003 | Hesse | 379/210.01 |
| 2004/0068648 | A1 * | 4/2004 | Lewis et al. | 713/153 |
| 2004/0078256 | A1 * | 4/2004 | Glitho et al. | 705/8 |
| 2007/0288353 | A1 * | 12/2007 | Etkin | 705/37 |
| 2008/0008163 | A1 * | 1/2008 | Castell et al. | 370/352 |

OTHER PUBLICATIONS

Ahmed Ashir et al., "A Meeting scheduling system for global events on the internet," Geneva, Switzerland, Jul. 1998.

(Continued)

*Primary Examiner*—Steven P Sax
(74) *Attorney, Agent, or Firm*—Lumen Patent Firm (57) ABSTRACT

A hook-up assistant (HUA) capable of assisting people in hooking up with other people, in various business and social settings, and of achieving decision-making, planning, and commitment activities asynchronously, thereby advantageously off-loading an event requester's tedious tasks of communicating with multiple potential participants and resource/service providers for an intended event/activity. The HUA effectively eliminates "phone tag" problems and beyond, by enabling a user to simply "make a wish," e.g., "make an event happen." The HUA takes appropriate actions to "make the wish a reality," i.e., contacting all parties involved, determining mutually agreeable dates, times, arranging necessary devices, resources, and services, securing reservations, purchasing admission tickets, etc., to ensure all parties involved can actually participate in the event at the planned time and place. The HUA can communicate with animate/inanimate entities as well as other HUAs regardless of virtual/physical boundaries such as platforms, protocols, systems, networks, and the like.

39 Claims, 2 Drawing Sheets

OTHER PUBLICATIONS

Sandip Sen, "An automated distributed meeting scheduler," IEEE Expert, vol. 12, No. 4, pp. 41-45, Jul./Aug. 1997.

Sandip Sen et al., "Satisfying user preferences while negotiating meetings," International Journal of Human-Computer Studies, vol. 47, pp. 407-427, 1997.

Sandip Sen et al., "A formal study of distributed meeting scheduling," Group Decision and Negotiation, vol. 7, pp. 265-289, 1998.

Amie Capone, "Meeting Maker, Inc. Releases scheduling Web services toolkit," retrieved on Aug. 12, 2003. Retrieved from the internet: < URL: http://www.meetingmaker.com/nes/20030121.cfm>.

* cited by examiner

FIG. 1

FIG. 2

HOOK-UP ASSISTANT

BACKGROUND OF THE INVENTION

1. Field of the Invention

This invention relates generally to intelligent software agents. More particularly, it relates to a computer-implemented Hook-Up Assistant (HUA) capable of intelligently assisting a user to get together (hook-up) with one or more identified parties at the most convenient time for all parties involved.

2. Description of the Related Art

The most advanced, state-of-the-art communication devices can be virtually useless if the person that you desperately try to reach is unavailable. To make it even more frustrating, often times you have no idea when and if that person will be available and where and how you can get in touch with him or her at the earliest time and place that would be the most convenient for both of you. Such "hook-up" problems can undesirably snowball in a "phone tag" situation. "Phone tag" is an everyday experience where one party calls the other, only to find that other party is unavailable, and leaves a message requesting the other party to call back. The other party gets the message and calls back, only to find the original caller unavailable, and thus leaves a message for a call back, and so on. This can go back and forth many times, frustrating both parties and wasting considerable time.

Many types of intended hook-ups can cause a "phone-tag" situation, i.e., to attempt to arrange for a get together, at least two parties leave messages for each other in a back-and-forth fashion. Two criteria essentially define the challenge of solving the hooking-up problems. First, the parties must find and agree on a time when and where they are mutually available for a certain event. Second, they must actually meet, talk, communicate, get together, or otherwise participate in the event at the agreed time. The hook-up problems can be very complex and difficult to solve when multiple parties are involved and/or when special locations, resources, or communication channels must be reserved, furnished and utilized.

Certain personal calendar, group and shared calendar, and collaborative scheduling software programs are currently available on the market to address some simple forms of the hook-up problems. For example, Meeting Maker, Inc. offers a calendar management system that can process requests for a meeting among co-workers and search all co-workers' schedules that are maintained and accessible by the system. The system identifies possible times for meetings and proposes these possibilities to the co-workers or their human assistants. The human assistants confirm the meeting time and the system adds it to the co-workers' calendars/schedules. In this example, all co-workers use the same calendar management system within the boundaries of a single organization/entity. This prior art system essentially provides a centralized means of finding time slots on everyone's schedule that permits a requested meeting to be scheduled, or suggests the best possibilities if not everyone can be accommodated.

Like Meeting Maker, most commercially available calendaring/scheduling products do not address hook-up problems related to connecting people whose calendars and schedules are not singularly coordinated using the same computer program and/or within the boundaries of the same entity. Meeting Maker recently announced the Scheduling Web Services Toolkit, a program development tool designed to allow software and web developers in an organization to integrate Meeting Maker's time management engine into their own organizational portals, company intranet or other applications. Specifically, the Meeting Maker Web Service connects the Apache Axis Web service engine to the Meeting Maker Java interfaces to allow access to Meeting Maker data and functionality for any application that knows how to read and write industry standard SOAP-formatted XML (eXtensible Markup Language). This provides cross-platform programmatic access which can be used to add Meeting Maker access to enterprise applications such as portals or data mining applications. The Meeting Maker Web Service aims to eliminate the need of enterprises to use the Meeting Maker native or web Client to access Meeting Maker's real-time scheduling capabilities. Although, conceptually, users of the web service may view their calendar data and edit, create, and delete activities and banners without being confined to the boundaries of their respective organizations, they unfortunately would still have hook-up problems because the Meeting Maker Web Service does not offer hook-up services.

Another web-based scheduling approach faces similar drawbacks. In "A Meeting Scheduling System for Global Events on the Internet," Geneva, Switzerland, July 1998, Ahmed et al. propose a scheduling algorithm for large, global conferences. To make the system capable of processing multiple meetings concurrently with minimal wastage of timeslots, the bidding method of the traditional Contract Net protocol is extended. More specifically, the scheduling algorithm employs additional heuristics to achieve preferred outcomes, taking into consideration factors such as degree of participation and times of day for people operating in different time zones and calendars. Ahmed et al.'s approach is built on the assumption that it is not always necessary for all prospective participants to attend a meeting. Thus, the algorithm finds a time slot that best meets the requirements of the host of a conference and the potential participants and does not attempt to arrange hooking up individual participants who may not be able to attend the conference.

Consequently, hooking up with people who are not part of the same managed domain and/or are not supported by a common scheduling application remains a major, unsolved problem. Moreover, initiating and effecting cross-platform, borderless hook-ups is a persistent challenge. What is needed in the art, therefore, is an intelligent assistant that can make hooking up with intended parties an easy, effortless experience.

SUMMARY OF THE INVENTION

The present invention provides a Hook-Up Assistant (HUA) that enables its user to establish a time for the user to connect with one or more identified parties. The HUA intelligently and proactively determines time and communication means that would be feasible for all parties involved. The types of connection include wired (W), wireless (WL), and face-to-face (F2F). The HUA may be implemented as a stand-alone device. Alternatively, it can be embedded or otherwise integrated in a variety of network-enabled devices including all kinds of mobile devices, Internet-enabled appliances, telephones, computers, and video cameras. The HUA can assist its human users to meet in virtually any locations deemed acceptable by the users, such as boats, homes, restaurants, offices, physical as well as virtual locations. The HUA consults the calendars, schedules and preferences of each party involved to determine feasible times and proactively tentatively commits each party to a "date." It then confirms the "date" with each party using a variety of methods, including sending a message, verbally consulting, and receiving confirmation messages. The HUA may also have permission to commit its user to certain hook-ups without obtaining additional confirmations. In the simplest use, the HUA operates to solve the "telephone tag" problem discussed above. That is, the HUA plans a time for the two or more parties to talk and originates the call at the planed time. The HUA also enables friends and associates to "get together" at a mutually acceptable time and place by finding a candidate that satisfies each party's personal preferences and constraints. The HUA can interact with a variety of calendar and scheduling applications running under different operating systems on various platforms, so long as these applications at least intermittently reside in network-accessible devices having network-accessible interfaces.

The HUA addresses the challenges faced by people who want to connect with others. In addition to making such connections occur reliably and easily, the HUA may be integrated with security means to protect the privacy and confidentiality of its users' data. That is, the HUA accepts inputs from its users about their preferences and constraints on which types of "dates" they will accept, the people they wish to connect with, and which kinds of data they will share with others. The HUA interacts with other people, programs, devices, and other HUAs as needed to obtain and provide schedule data, to request and confirm appointments, to schedule, monitor, and alert them about planned events, and to initiate and terminate connections when appropriate.

Still further objects and advantages of the present invention will become apparent to one of ordinary skill in the art upon reading and understanding the detailed description of the preferred embodiments and the drawings illustrating the preferred embodiments disclosed hereinafter.

DETAILED DESCRIPTION OF THE PREFERRED EMBODIMENTS

In the aforementioned example, the Meeting Maker's centralized scheduling system maintains calendar data for multiple employees in an enterprise and checks these calendars for availability when a meeting among multiple people is requested. The system suggests best options that suit the agenda/objectives of the requested meeting. The proposed time and participants are either confirmed or rejected by the requestor or a human assistant. Facilities such as rooms can be scheduled to support a tentatively scheduled meeting. Meetings are committed by showing participants and locations on the calendars of each participant.

Researchers have studied how meetings can be arranged among distributed participants each of which is assisted by an "agent" that can determine time of availability for the requested participants. In some cases, the "agent" is a human. The currently best distributed meeting scheduling methods known to the inventor can be found in the following papers, the contents of which are incorporated herein by reference: Sandip Sen et al. "Developing an automated distributed meeting scheduler," IEEE Expert, vol. 12, no. 4, pp. 41-45, July/August 1997; Sandip Sen et al. "Satisfying User Preferences While Negotiating Meetings," International Journal of Human-Computer Studies, vol. 47, pp. 407-427, 1997; and Sandip Sen et al. "A Formal Study of Distributed Meeting Scheduling," Group Decision and Negotiation, vol. 7, pp. 265-289, 1998.

The present invention provides improvements to the currently best known methods of distributed meeting scheduling, including the HUA and its abilities to interact with entities beyond people. That is, the HUA is capable of communicating with animate/inanimate entities, e.g., people, devices, resources, services, and the like. Each entity may or may not be represented by an animate/inanimate "agent." An exemplary animate "agent" is a human and an exemplary inanimate "agent" is a network-accessible interface of a network-enabled device. Unbeknownst to its user, the HUA, once activated, promptly and efficiently acquires and obtains necessary entity information from each entity and/or the entity's "agent" to schedule or otherwise arrange for a "get together" at the earliest or most convenient time without being limited by any physical boundaries and/or platform/network protocols.

In a preferred embodiment, the HUA is built on the distributed meeting scheduling approach proposed by Sandip Sen et al. to solve the problem of when would be the best time N distributed entities could be committed to a planned activity. Alternatively, the HUA can be readily implemented with any suitable distributed meeting scheduling algorithms, methods, systems, and protocols, including the Calendar Access Protocol (CAP) recently proposed in an Internet Society's "work in progress" document prepared by the Internet Engineering Task Force (IETF) Calendaring and Scheduling (CALSCH) Working Group, led by D. Royer of INET-Consulting. The CAP described in the IETF working document is an Internet protocol that permits a Calendar User (CU) to utilize a Calendar User Agent (CUA) to access a particular calendar (iCAL) based Calendar Store (CS), allowing for the management of calendars, events, and to-dos over the Internet. Information related to the CAP and the IETF CALSCH Working Group can be found at <URL: http://www.ietf.org/html.charters/calsch-charter.html> and thus is not further described herein.

As one skilled in the art would appreciate, using techniques currently available in distributed artificial intelligence, web services, and distributed computing, it is relatively straightforward to create a system capable of finding time slots when N entities are available for a desired activity that requires those entities to be at a particular place and in an "available" state relative to their specified constraints and known obligations. Using web services or other network protocols, it is also relatively straightforward to request, bid for, or otherwise obtain commitments of resources and services that would satisfy the requirements of, or would be appropriate for, the planned events. Similarly, it is not a difficult task to access, query, activate and update network-enabled devices and calendars on those devices. Thus, it is known, for example, how to place a telephone call to initiate a web conference, to purchase a ticket, or to reserve a table at a restaurant. Indeed, the rise of the Internet, web-accessible services, and web services now makes it possible for people to access, procure, and provide resources and services via network communications.

On the other hand, as discussed before, existing calendaring and scheduling products are not capable of providing hook-up assistance to schedule and accomplish interactions amongst people, networked devices, resources, and services consistent with personal calendars without being limited by physical and/or virtual boundaries. In essence, the HUA of the present invention improves the concept of using distributed agents for making a meeting by proactively and actually connecting people at an appointed time. The HUA can be invoked automatically as an option when a user calls another and gets a busy signal. As another example, the HUA can be invoked when the called party's telephone is answered by an answering machine or voicemail. The HUA can be extended to networked devices, resources, and services and can schedule various kinds of connections, including F2F, WL, and W conferences, without being limited by platforms and/or network protocols.

Figure 1:
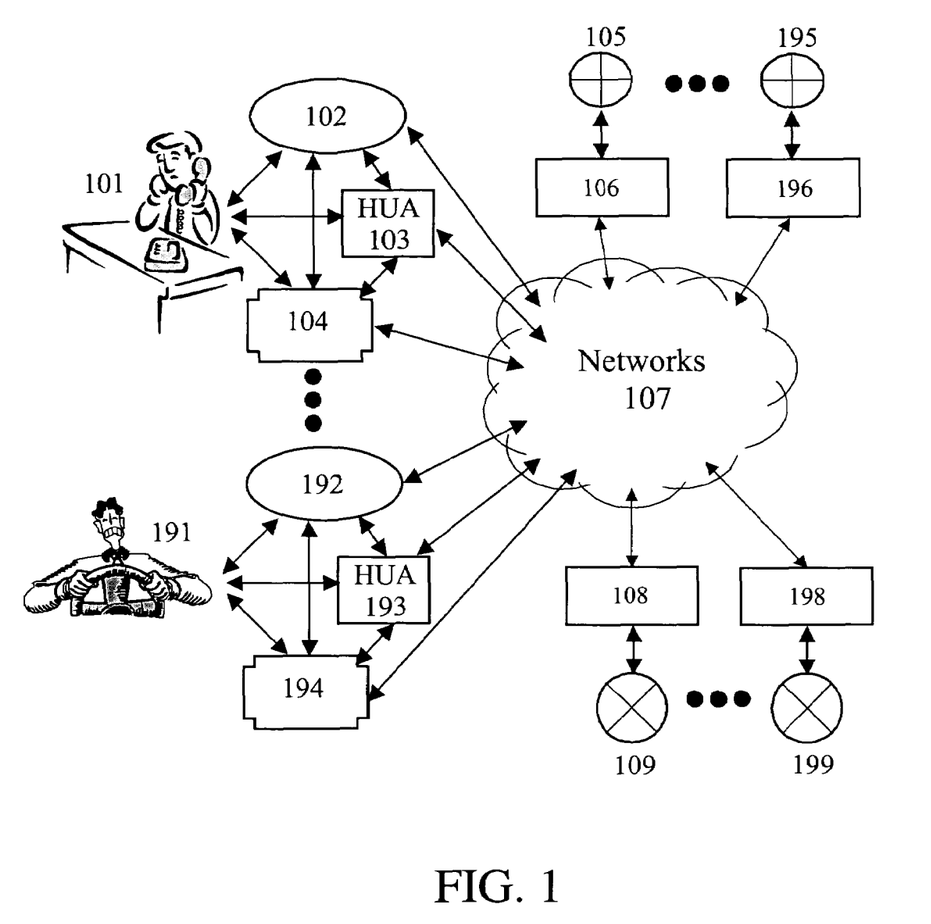
FIG. 1 illustrates the role of the HUA among people, devices, personal data stores, resources, services, interfaces and communication networks.

FIG. 1 illustrates the role of the HUA as well as the interactions amongst the HUA, people, devices, data storages, resources, services, interfaces, and networks. To avoid obscuring the principles of the invention and for the sake of brevity, known methods, devices, systems, and protocols may be discussed herein without giving details. In the example shown in FIG. 1, a plurality of users, e.g., user 101 through user 191, interact to make "dates" or "hook up." User 101 is associated with personal data storage means 102 and one or more devices 104. HUA 103 supports user 101. Similarly, user 191 is supported by HUA 193 and associated with personal data storage means 192 and one or more personal devices 194. These data storage means, devices, and HUAs utilize networks 107 to read and write data and to communicate with other systems, devices, data storage means, and HUAs. Examples of networks 107 include the Internet and telecommunications networks.

Each HUA is capable of communicating with interfaces 106 . . . 196, and 108 . . . 198 to query, schedule, procure, provision and, in some cases, directly control network-enabled device such as resources 105 . . . 195 and services 109 . . . 199. For example, user 101 can request his HUA 103 through device 104 such as a telephone, a mobile phone, an intelligent agent, or a personal digital assistant (PDA) to schedule a telephone call at 7:00 PM with user 191's telephone 194 and might also schedule a resource 105 such as a video sales presentation to be provided via a teleconferencing service 109 that will simultaneously link user 101's own personal computer with user 191's personal computer. In fulfilling this request, the HUA 103 interacts with user 191's HUA 193 to determine, consistent with the preferences and constraints of both user 101 and user 191, an appropriate time when both user 101 and user 191 will be available to participate in the event. The HUA 103 then schedules the event (the telephone call and the video) on user 101's calendar and possibly user 191's calendar, if it has the proper privileges to access and alter user 191's calendar. User preferences and constraints, as well as the HUA's privileges to access and alter other users' calendars will be discussed in detail in a later section. The HUA 103 communicates with interfaces 106 and 108 to make arrangement with the video sales presentation 105 and teleconferencing service 109. At the scheduled appropriate time, or substantially close to the scheduled appropriate time, the HUA 103 initiates the telephone call on behalf of user 101 calling and video conferencing user 103 to show the sales video.

Each HUA can be activated in many ways. In addition to a user request as discussed above, the HUA can be configured so it is responsive to a request that modifies a previous event or activity. The request can be in a form of spoken language or manually entered natural or computer language. In addition, the HUA can be voice-activated over the phone, remote-activated via electronic signals, or direct-activated via a telephone or any suitable input device in response to a triggering mechanism such as a tone, a button, a key, a sound, a spoken word, a sequence of tones, a sequence of buttons, a sequence of keys, a sequence of sounds, a sequence of spoken words, or a combination thereof. Suitable input devices include keyboards, keypads, mice, microphones, and the like. The sounds can be patterns of clapping, bell rings, etc. The words can be phrases or commands. A variety of triggering mechanisms known in the art can be readily implemented in telephones, mobile phones, communication devices, network-enabled devices, PDAs, personal computers, laptops, and the like to invoke the HUA. Alternatively, the HUA can be configured so it is automatically activated in response to an incomplete telephone call made by or to its user. The incomplete telephone call can be indicated by intercession of any animate or inanimate entity, e.g., a busy signal, a facsimile machine, an answering machine, a voicemail service, a computerized agent, a human agent, a human assistant, a receptionist, a secretary, and the like.

The activation could invoke one or more functions of the HUA or the full HUA. Once activated, the HUA automatically contacts or automatically schedules when, where, and whom or what to contact. The user can also specify, or let the HUA to decide, how the HUA is to contact the others, e.g., by phone, text message, voice message, email, or any suitable means. As an example, in response to an incomplete telephone call made by its user 101 to user 191, a function of the HUA 103 is automatically invoked to call or send text/voice messages to user 191's personal device 194 such as mobile phone, pager, PDA, email accounts and so on, indicating to user 191 that user 101 requests to schedule a get together. The request can be scheduled to occur periodically until a certain criterion, such as time, frequency, and/or reply, is satisfied. The HUA 193 receives the request via device 194 and interacts with the HUA 103 to schedule an appropriate time for users 101 and 191 to have a phone conversation, hence eliminating the aforementioned "phone tag" situation.

In the above examples, the HUA 103 interacts with the HUA 193. The HUA 103 may alternatively interact with a human agent or assistant (not shown) of user 191 or even user 191. The interaction between a HUA and a human includes soliciting inputs from the human and proposing an event and/or activity based on the inputs. In a simple implementation, the inputs can be yes or no answers and the HUA proposes an event and/or activity based on a series of yes or no answers.

Interfaces 106 and 108 provide means to schedule, commit, and enact the provision of associated resources and services through communicated queries, requests, and other messages. Web services, for example, are Internet-enabled interfaces to computer applications. The HUA is capable of invoking such web services. As one skilled in the art would appreciate, a variety of interface types and protocols for communications is acceptable, as different networks typically utilize varying standards. By exploiting applicable communication networks, the HUA is capable of exchanging calendar data and scheduling information essentially without the constraints of physical and virtual boundaries such as distance, language, platforms, operating systems, network protocols, and the like. More specifically, the HUA is capable of encoding existing cross-domain structured syntax language including hypertext markup language (HTML), extensible HTML (XHTML), XML, XML document type definition (DTD), and XML schema.

In addition to availability, the HUA 103 also makes sure that users 101 and 191 will be able to participate in the event at the selected appropriate time. The HUA 103 first determines whether all parties involved will have access to suitable communication means and whether the communication means will be available at the selected appropriate time for the required duration. If not, the HUA 103 takes necessary steps to obtain suitable available communication means for all parties involved for the selected time frame or proposes an alternate time or activity. Otherwise, the HUA 103 sends out reminders, at a pre-set frequency, to remind all parties involved about the impending phone conversation, business meeting, family gathering, social engagement, etc.

A variety of communication means may be suitable for different events/activities. These include, for example, W and WL communication devices, resources, web-based services, cellular phones, telephones, video phones, Internet-enabled phones, Internet-enabled input devices, instant messaging, virtual meeting places, online chat rooms, online games, Multi-User Dungeons (MUDs), MUD Object Oriented sites (MOOs), personal digital assistant (PDA), and World Wide Web Consortium (W3C) compliant multimodal interaction devices and the like.

Figure 2:
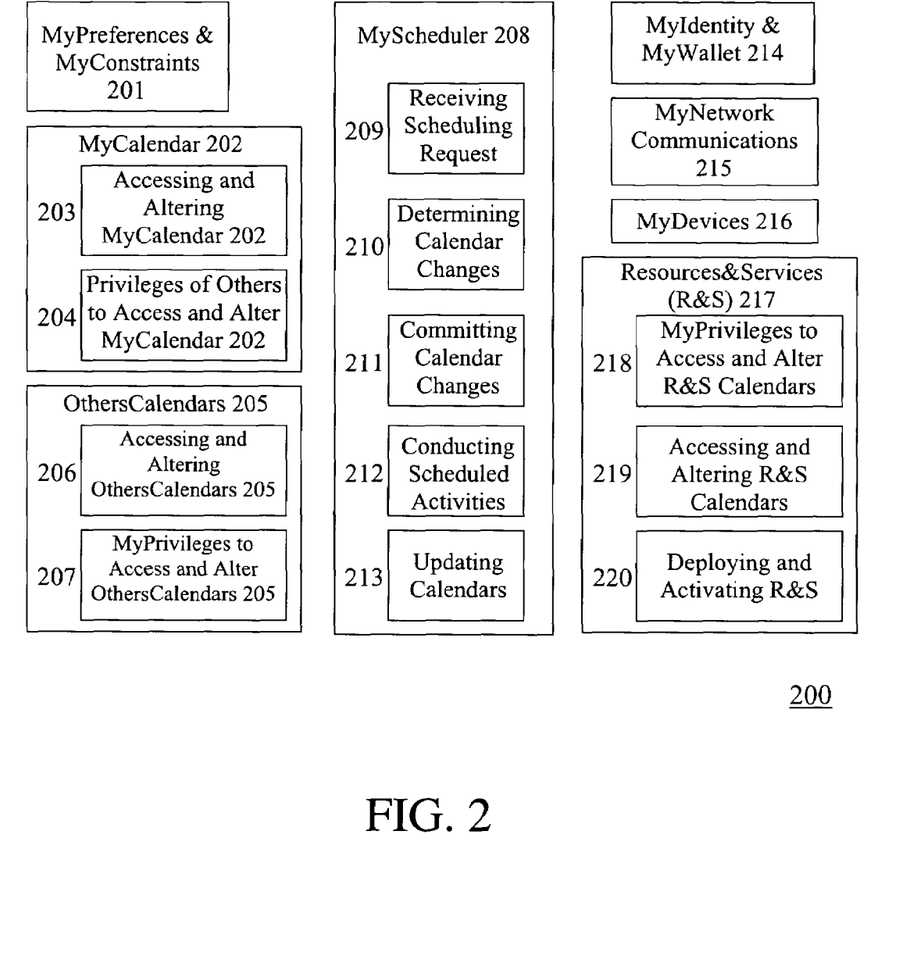
FIG. 2 shows principal components of the HUA.

FIG. 2 illustrates the principal functional components of a HUA 200. While a HUA is capable of associating with a group or set of people or entities, for exposition purposes here the HUA 200's supported entity is a single user. That user has preferences, such as preferred hours for work vs. social affairs, and constraints, such as unbreakable commitments and obligations. The HUA 200's data about the user's preferences and constraints are shown as MyPreferences and MyConstraints 201. The reader should view each of these boxes shown in FIG. 2 as an object, as in Object-Oriented Programming (OOP), where the object provides means for storing state information and means for accessing and/or modifying that state information. These accessors are often characterized as Get and Put methods. However, as it can be understood by one skilled in the art, the actual procedures and their names may vary and thus are not considered material to the present invention. With these objects, the HUA 200 is capable of accessing, reading, and modifying the user's preferences and constraints, and will ordinarily do that in response to commands by the user or as a side-effect of commitments made for or by the user.

The HUA 200 contains a user calendar such as MyCalendar 202. MyCalendar 202 employs object 203 for managing how MyCalendar 202 is accessed and/or altered by the user and object 204 for controlling how others may access and/or alter MyCalendar 202. MyCalendar 202 contains information about where the user will be at what time, e.g., information related to the user's schedules, events, and/or tasks, as well as information related to how various time intervals may be utilized, e.g., time reserved for work, social affairs, and so on. In addition, MyCalendar 202 contains user's device information about where and when the user's devices will be available/unavailable, accessible/inaccessible, and how they may or may not be employed. For example, MyCalendar 202 may contain information indicating that the user's cell phone (user and user's device) will be turned off (unavailable and inaccessible) while the user attends a concert on Saturday evening from 7:30 PM to 10:30 PM (time reserved for a social event). Thus, MyCalendar 202 describes the current and future commitments made by or on behalf of the user and his devices as well as intervals during which he or they may be accessed and employed.

The HUA 200 employs objects that can be thought of as views, surrogates, or proxies for OthersCalendars 205. "View" is a term used in the database art to refer to selected subsets. For example, object 206 enables the HUA to determine its (i.e., its user's) privileges in accessing and altering other users' calendars and object 207 enables the HUA 200 to actually access and alter others' calendars. As such, a husband may be able to access but not alter his wife's calendar (i.e., access with a read-only privilege). On the other hand, he may be able to access and alter his child's calendar (i.e., access with a read/write privilege). Moreover, the HUA 200 enables him to propose (e.g., with an access privilege) business meetings with a colleague without committing the colleague to the proposed meetings. These objects can be implemented in web services and/or other network (e.g., intranet, Internet, etc.) enabled protocols. In some embodiments, the calendars of a plurality of users might reside on the same server, obviating the need to access them via network communications.

The HUA 200 contains a scheduler, i.e., MyScheduler 208, which alters MyCalendar 202 in response to requests and other events. MyScheduler 208 includes object 209 for accommodating the user's wishes to schedule appointments. Object 209 also receives and processes incoming requests from others wishing to schedule a hook-up with the user. In response to a scheduling request, the HUA 200, via object 210, determines whether and how its user's calendar, in this case, MyCalendar 202, would be affected. For example, if the user requests a telephone hook-up with his spouse between 6:00 PM and 7:00 PM, the HUA 200 might determine that the hook-up should occur from 6:15 PM to 6:30 PM, a period of time when both people and their associated devices are expected to be available and accessible. The determination of exactly when the hook-up event should occur is made according to various well researched heuristics, see, e.g., Sandip Sen et al. papers discussed above. For example, a user's HUA can propose a specific time to the other's HUA which can confirm availability, or the user's HUA can propose one or more intervals to the other's HUA which can then choose a preferred and available subinterval. A typical commit transaction can be used to implement object 211 for committing calendar changes. That is, the user's HUA begins a transaction when it wants to block out the agreed upon time for the hook-up and completes the transaction when all of the supporting objects it and the other's HUA employ complete their work successfully. At that point, the status or type of the commitment in the user's calendar is changed from tentative to definite.

As a committed scheduled event or activity gets closer in time, MyScheduler 208 determines when and how to enact the committed scheduled event/activity and initiates object 212 for handling the scheduled event/activity accordingly. For example, as in the preceding telephone date example, the user's HUA 200 initiates a phone call at 6:14:40 PM, so that the spouse's telephone would ring as close to 6:15 PM as possible. Based on the user's preferences contained in, e.g., MyPreferences & MyConstraints 201, MyScheduler 208 might further alert the user of the impending call, for example, with a 2-minute advance warning. If MyScheduler 208 determines that the user is conducting another telephone call on the same device, it might notify the user with auditory or tactile stimuli, beginning at 6:10 PM. MyScheduler 208 might further assist the user by terminating the earlier call precisely at 6:15 PM, or perhaps no later than 5 minutes after the scheduled event, depending on the user's preferences as indicated in MyPreferences & MyConstraints 201.

The HUA 200 is capable of "rescheduling" events that become infeasible for some reason. For example, each of the following types of "events" warrant rescheduling: a planned hook-up doesn't work as planned; a person becomes unavailable for a time previously assumed available and incorporated into a scheduled event; a device, resource, or service previously assumed available and incorporated into a scheduled event is now determined to be unavailable, or to have a price increase, or otherwise to be less desirable than planned. Any of these reasons can trigger rescheduling. The rescheduling can be done automatically on behalf of the user(s). The need for rescheduling can be suggested to the user and then explicitly requested by the user. The user in that case could also change the specification for what is desired and acceptable. The user could also cancel the scheduled event in response to the notification.

Thus, in case of an unavoidable delay in keeping the 6:15 PM appointment, the HUA 200 would notify the affected party (in this example, the spouse), and reschedule the call to 6:45 PM or some other suitable time, or suggest an alternative activity, e.g., "How about meeting your wife at home at 7 PM?" One skilled in the art would appreciate that a wide range of heuristics and procedures to enact and conduct scheduled activities are currently available and can be readily implemented with the HUA, e.g., incorporating them as extensions and elaborations to those illustrated, responsive to the MyPreferences & My Constraints 201, MyCalendar 202, and OthersCalendars 205.

MyScheduler 208, via object 213, is capable of updating MyCalendar 202 and OthersCalendars 205 as time passes and events unfold. When, for example, it determines that it is necessary to reschedule a telephone call because either the caller or the user called is "busy" or unexpectedly unavailable, MyScheduler 208 may change the planned hook-up time. As time passes, MyScheduler 208 can remove from the calendar events whose times have passed. As one skilled in the art would know, MyScheduler 208 as well as object 213 can be readily implemented to accommodate various reasons that might motivate calendar updates/changes and thus is not further described herein for the sake of brevity.

The HUA 200 maintains personal information in MyIdentity & MyWallet 214. This enables the HUA 200 to identify itself to those with whom/what it interacts. MyIdentity & MyWallet 214 may store and employ passwords, credit cards, and other required/relevant information.

The HUA 200 also maintains, where applicable, information related to network communications in MyNetworkCommunications 215. This enables the HUA 200 to communicate via the networks available to it or through the user associated computer/device where it resides. For example, it might have telephone numbers for long distance dialing, along with account numbers in MyWallet, and it might have network configuration settings for connecting to the Internet (e.g., TCP/IP for WL and/or W connections). Other communication network capabilities are possible and readily understood by one skilled in the art.

The HUA 200 maintains information about the user's devices in MyDevices 216. This object enables the HUA 200 to access the devices and interact with them in appropriate ways. For example, MyDevices 216 might describe the user's phones including types (cellular, home, work, fax, etc.) and numbers, his email accounts, his instant messenger accounts, and the like. In addition, MyDevices 216 provides means for initiating activities on these devices, for sending information to them, and for receiving information from them, as appropriate. The properties of the devices and their state over time, e.g., available or unavailable, are maintained in calendar data as part of MyCalendar 202 for the devices that are considered associated with the user. Similarly, the type, properties, and availability of devices associated with other users are accessible through OthersCalendars 205 and its related objects.

The HUA 200 maintains in Resources&Services (R&S) 217 information about resources and services that it can potentially access and employ. Examples of resources include a special piece of equipment, a document, a digital recording, a particular food or beverage, or a room with appropriate size and furnishings for a particular meeting. Object 219 provides the means for accessing and altering R&S calendars such that the HUA 200 can schedule needed resources, if it has the appropriate privileges per object 218. In other words, the HUA 200 first assures that it has appropriate privileges to access and alter the resources' calendars. Next, it determines which resources are available at the time needed and correspondingly alters the resources' calendars to commit them for the event. It then assures, via object 220, that the resources are physically available at the right place at the right time for deployment and activation. Many Internet portals make reserving and procuring resources a relatively easy task. Alternatively, web services can be employed to schedule and activate resources.

The HUA 200 maintains information about services in a manner substantially similar to that employed for resources. Whereas resources are usually considered as having a physical presence, occupying some space and time, services are usually considered more ephemeral and are valued for their behaviors rather than their physical properties. Often services are employed to convert a resource from one form to another, to produce a new resource, or to otherwise alter a resource. Examples of services include paying for a resource or a service, finding a resource or service that satisfies certain criteria, translating/converting an information source into a different language, reserving a table at a restaurant, reserving a conference room for a business meeting, etc. The HUA 200 consults object 218 to determine which services it wants and when, alters by way of object 219 the services' calendars to reflect those commitments, and finally deploys and activates, through object 220, the committed services at an appropriate time.

In addition to finding, scheduling, and securing people, time, place, devices, resources, services, and sending out reminders, the HUA is enabled to purchase admission tickets, tokens, or permits, where applicable, for all parties involved so that they can attend the scheduled event/activity. Similarly, if necessary, the HUA can generate or otherwise obtain digital or physical invitations for all parties involved so that they can attend the scheduled event/activity. Again, if for some reasons the scheduled event/activity is found infeasible or otherwise less desirable than planned, the HUA can suggest alternatives to bring all parties involved together. When a new request can only be desirably satisfied by impinging on one or more prior commitments, the HUA can also propose appropriate changes in the prior commitments on affected calendars. Moreover, with proper privileges, either predetermined or obtained in real time, the HUA can modify or alter the prior commitments as necessary. The user can specify whether the HUA is to determine independently how the affected prior commitments should be altered or per user instruction. For the former, the HUA automatically alters, in accordance with proper privileges, preference, and constraints, the prior commitments on the affected calendars and promptly notifies those whose calendars have been altered. The modification/alteration includes rescheduling the prior commitments, replacing the prior commitments with appropriate alternatives, or a combination of both.

Accordingly, the HUA is capable of determining when interactions should occur and of assuring that appropriate people, devices, resources, and services are available and active at a certain, agreed time. It accesses and coordinates calendars for all of the associated entities, consistent with their respective preferences, constraints, privileges, and availability. Multiple devices can be employed. Communications can occur over a diverse array of communication networks and protocols. What is more, the HUA advantageously eliminates hook-up problems, especially the "phone tag" situation, because it enables a caller to request the HUA, either the caller's HUA or the other party's HUA, to make "a date" for another phone call and the HUA is able to, automatically or upon request, bring the caller and the other party, as well as any necessary resources and/or services, together at the earliest time that is convenient and agreeable to all parties involved, including the associated devices, resources, and services, where applicable.

As one skilled in the art would appreciate, the HUA of the present invention can solve hook-up problems beyond the "phone tag" situation. Based on the same principles and methods disclosed herein, the HUA can be utilized to bring parties and resources together for many types of convocations. For example, the user's HUA can bring several people together for dinner at an Italian restaurant in San Francisco within 7 days by finding a dinner period when each person can attend the get-together in San Francisco, finding an Italian restaurant in San Francisco, obtaining a reservation at that restaurant within the intervals the people are all available, committing these times, places, and activities on each participant's calendar, and reminding the participants in ways consistent with their preferences of the need to be at the appropriate location, dressed appropriately, at the time committed to the get-together event. The HUA can handle multiple hook-up requests, each specified in terms of a series of people or groups with whom interactions are separately desired. In this case, the sequence of the interactions can be correlated with the order of the series of people or groups. The HUA further assists its user to minimize resources, including time and expenses, associated with participating in all scheduled events on the user's calendar.

In some distributed network embodiments, one HUA maintains a federated calendar that contains information related to associated users, devices, resources, and services as well as corresponding privileges, constraints, and preferences. The HUA is capable of accessing and retrieving, in according with the stored privileges, constraints, and preferences, calendar/scheduling information from multiple sources in the distributed network environment. Integrated views of the federated calendar are generated based on the retrieved calendar/scheduling information.

In sum, the HUA can assist people in hooking up with other people, in various business and social meetings and activities, and can achieve all of the decision-making, planning, and commitment activities asynchronously, thereby advantageously avoiding or otherwise entirely eliminating the need for people to communicate synchronously in advance to schedule participation/attendance in a desired event/activity. This has the great advantage of allowing people to effectively dispatch their desires to the HUA in somewhat a "fire-and-forget" mode. Once the HUA receives the request, the user who made the request need not be bothered again until some exceptional circumstance occurs or the time has arrived to remind, notify, or alert the user of the scheduled event/activity. The user can specify whether the HUA must obtain final confirmation on its scheduled events or whether, having received and tentatively satisfied some request, it may proceed to commit the tentatively scheduled event on behalf of the user. Thus, the HUA is able to offload the user's tasks of communicating with each of a plurality of participants and with each of a plurality of providers of the resources and/or services required for the intended event/activity. This goes way beyond eliminating simple "phone tag" problems. In other words, the HUA enables the user to "make a wish" (i.e., make an event happen) and walk away. The HUA then takes necessary and appropriate actions to "make the wish a reality," i.e., contacting all other parties involved, determining mutually agreeable dates, times, resources, and services, and so on, and ensuring all parties involved can actually participate in the event at the earliest, most convenient time and place with available resources and/or services necessary to realize the event. With the help of the HUA, the user's tasks are substantially reduced/minimized, leaving him simply to observe and adhere to his calendar and be financially and legally responsible for any event-related resource/service consumption.

The HUA and its functions disclosed herein can be embodied as application software in a stand-alone device accessible by the user, e.g., through his various associated devices and/or network connections known in the art. That stand-alone device would preferably be embodied as a personal computer, or perhaps an intelligent PDA, an intelligent mobile phone, a network-enabled device, or an Internet-enabled communication device. Alternatively, the functions of the HUA could be deployed in a client-server style, with each device the user employs being a client of one or more servers providing persistent data and assured transactions. The HUA server in that embodiment would synchronize with relevant data in each user client when connected, providing periodic consistency and completeness. The HUA server, further, could be replicated to provide additional availability and fault-tolerance.

Although the present invention and its advantages have been described in detail, it should be understood that the present invention is not limited to or defined by what is shown or described herein. As one of ordinary skill in the art will appreciate, various changes, substitutions, and alterations could be made or otherwise implemented without departing from the principles of the present invention. That is, regardless of how the HUA objects and methods are implemented, the basic functionality of the invention remains the same. Accordingly, the scope of the present invention should be determined by the following claims and their legal equivalents.

What is claimed is:

1. A method of hooking up at least two people using a computer-implemented hook-up assistant (HUA), wherein said people are connected in a network environment having a plurality of users, and wherein each of said users has a network-enabled calendar, said method comprising:

automatically activating said HUA in response to an incomplete telephone call made by a first of said at least two people to a second of said at least two people, wherein said incomplete telephone call that triggers the automatic activation of said HUA is indicated by a busy signal, an answering machine, a voicemail, a facsimile machine, or a computerized agent, and wherein said activated HUA hooks up said at least two people by:

(a) determining an appropriate time when said at least two people to be hooked up will be available to participate in an event or activity;

(b) scheduling said event or activity at said appropriate time on respective calendars of said at least two people; and (c) initiating said event or activity substantially at said appropriate time, wherein said initiating said event or activity comprises establishing a real-time communication between said at least two people, wherein said real-time communication is selected from the group consisting of a phone call, an instant messaging session, an online chat, a video phone session, and a teleconference.

2. The method according to claim 1, wherein said HUA comprises preferences and constraints of one of said at least two people; and wherein said appropriate time is determined consistent with said preferences and constraints.

3. The method according to claim 1, wherein
said HUA comprises
　　privileges to access and alter said respective calendars of said at least two people, and
　　means for accessing and altering said respective calendars of said at least two people according to said privileges.

4. The method according to claim 1, further comprising:
activating said HUA in response to a request from one of said at least two people.

5. The method according to claim 4, wherein
said activating further comprises
　　interacting with said one of said at least two people; and
　　proposing said event or activity based on inputs obtained during said interaction.

6. The method according to claim 4, wherein
said activating further comprises
　　interacting with said one of said at least two people to solicit yes or no answers; and
　　proposing said event or activity based on said answers.

7. The method according to claim 1, further comprising:
activating said HUA in response to a request referring to a previous event or activity with desired changes thereto.

8. The method according to claim 4 or 7, wherein
said request is in a form of spoken or manually entered natural language, in a form of a computer language, or in a form of an electronic signal.

9. The method according to claim 1, further comprising:
exchanging data related to said respective calendars regardless of physical and virtual boundaries that include distance, language, platforms, operating systems, and network protocols, wherein said exchanging is accomplished by said HUA.

10. The method according to claim 9, wherein
said exchanging data comprises encoding a cross-domain structured syntax language including hypertext markup language (HTML), eXtensible HTML (XHTML), eXtensible markup language (XML), XML document type definition (DTD), and XML schema.

11. The method according to claim 1, further comprising:
assuring said at least two people be able to participate in said event or activity at said appropriate time.

12. The method according to claim 11, wherein
said assuring comprises
　　determining whether said at least two people will have, at said appropriate time, access to suitable communication means that will be available for use in said event or activity; and
　　reminding said at least two people about said event or activity.

13. The method according to claim 12, wherein
said suitable communication means include wired and wireless communication devices, resources, web-based services, cellular phones, telephones, video phones, Internet-enabled phones, Internet-enabled input devices, instant messaging, virtual meeting places, online chat rooms, online games, Multi-User Dungeons (MUDs), MUD Object Oriented sites (MOOs), personal digital assistant (PDA), and World Wide Web Consortium (W3C) compliant multimodal interaction means.

14. The method according to claim 1, wherein
said event or activity is a phone conversation, a business meeting, a family gathering, or a social engagement.

15. The method according to claim 1, further comprising:
securing reservations necessary to realize said event or activity for said at least two people.

16. The method according to claim 1, wherein
said event or activity requires admission tickets, tokens, or permits; and wherein
said HUA comprises means for purchasing said admission tickets, tokens, or permits for said at least two people to attend said event or activity.

17. The method according to claim 1, wherein
said event or activity requires invitations; and wherein
said HUA comprises means for obtaining invitations for said at least two people to attend said event or activity.

18. The method according to claim 1, wherein
said appropriate time or said event or activity is found infeasible or otherwise undesirable,
said HUA comprises means for proposing at least one alternative.

19. The method according to claim 1, further comprising
proposing changes in prior commitments on said respective calendars when a new request can only be desirably satisfied by impinging on said prior commitments.

20. The method according to claim 19, further comprising
altering said prior commitments in accordance with proper privileges predetermined or obtained in real time.

21. The method according to claim 19 or 20, wherein
said HUA is enabled to determine independently how said prior commitments can be altered; and wherein
said HUA automatically alters said prior commitments on said respective calendars to satisfy said new request and promptly notifies those affected by said alteration.

22. The method according to claim 21, wherein
said alteration is selected from the group consisting of rescheduling said prior commitments, replacing said prior commitments with alternatives, and a combination thereof.

23. The method according to claim 1, further comprising:
activating said HUA, or invoking one or more functions thereof, in response to a triggering mechanism selected from the group consisting of a tone, a button, a key, a sound, a spoken word, a sequence of tones, a sequence of buttons, a sequence of keys, a sequence of sounds, a sequence of spoken words, and a combination thereof.

24. The method according to claim 23, wherein
said HUA automatically contacts or automatically schedules to contact a person, an agent of said person, or a HUA of said person to schedule a hook-up event to bring its user and said person together.

25. The method according to claim 24, wherein
said contact is realized by phone, text message, voice message, or email.

26. The method according to claim 24, wherein
said scheduled contact is effected periodically until a certain criterion is satisfied.

27. The method according to claim 1, wherein
said HUA can be implemented as a computer product, wherein the computer product comprises a computer readable medium carrying computer-executable instructions implementing a plurality of functions of said HUA.

28. The method according to claim 27, wherein
said computer product is embodied in a phone, a stand-alone network-enabled device, a client, a server, or a combination thereof.

29. The method according to claim 27, wherein
said computer product is implemented as part of an instant messaging system.

30. The method according to claim 1, further comprising:
tentatively committing said at least two people to said event or activity by indicating said event or activity on said calendar of one or more of said at least two people participating in said event or activity.

31. A method of heuristically hooking up at least two people using a computer-implemented hook-up assistant (HUA), wherein said at least two people are connected in a network environment having a plurality of users, and wherein at least one of said users has a network-enabled calendar, said method comprising:

automatically activating said HUA in response to an incomplete telephone call made by a first of said at least two people to a second of said at least two people, wherein said incomplete telephone call that triggers the automatic activation of said HUA is indicated by a busy signal, an answering machine, a voicemail, a facsimile machine, or a computerized agent, and wherein said activated HUA hooks up said at least two people by:

tentatively scheduling an appropriate time for an event or activity to be attended by said first and said second people, wherein said tentatively scheduled event or activity is on said calendar of said first person, and wherein said scheduling is based on one or more heuristics; and initiating said event or activity substantially at said appropriate time, wherein said initiating said event or activity comprises establishing a real-time communication between said at least two people, and wherein said real-time communication is selected from the group consisting of a phone call, an instant messaging session, an online chat, a video phone session, and a teleconference.

32. The method according to claim 31, wherein said heuristics comprise a time delay or a time interval.

33. The method according to claim 31, further comprising allowing said second user to confirm availability at said tentatively scheduled time or cancel said scheduled event or activity.

34. The method according to claim 33, wherein said second user can reschedule said event or activity, and wherein said rescheduling is based on one or more heuristics.

35. The method according to claim 31, wherein said tentatively scheduled event or activity is communicated to said second user.

36. The method according to claim 35, wherein said tentatively scheduled event or activity is communicated to said second user with a phone message, a text message, a voice message, or an email.

37. The method according to claim 35, wherein said tentatively scheduled event or activity is on said calendar of said second user.

38. The method according to claim 31, wherein said incomplete telephone call that triggers the automatic activation of said HUA is indicated by an unanswered call.

39. The method according to claim 1, wherein said incomplete telephone call that triggers the automatic activation of said HUA is indicated by an unanswered call.

* * * * *

UNITED STATES PATENT AND TRADEMARK OFFICE
CERTIFICATE OF CORRECTION

PATENT NO. : 7,552,393 B2
APPLICATION NO. : 10/642398
DATED : June 23, 2009
INVENTOR(S) : Frederick Hayes-Roth It is certified that error appears in the above-identified patent and that said Letters Patent is hereby corrected as shown below:

In Column 1, line 56 change "permits" to -- permit --
so that it reads -- ... that permit a requested meeting to be ... --

In Column 6, line 16 change "HUA to decide" to -- HUA decide --
so that it reads -- ... HUA decide, how the HUA is to ... --

In Column 6, line 23 change "get together" to -- get-together --
so that it reads -- ... requests to schedule a get-together. --

In Column 13, line 41 change "two people be able" to -- two people will be able --
so that it reads -- ... said at least two people will be able to participate ... --

In Column 13, line 59-60 change "digital assistant (PDA)" to -- digital assistants (PDAs) -- so that it reads -- ... digital assistants (PDAs), and World Wide Web ... --

Signed and Sealed this

Twenty-fifth Day of August, 2009

David J. Kappos
*Director of the United States Patent and Trademark Office*

UNITED STATES PATENT AND TRADEMARK OFFICE
CERTIFICATE OF CORRECTION

PATENT NO.         : 7,552,393 B2
APPLICATION NO.  : 10/642398
DATED              : June 23, 2009
INVENTOR(S)       : Frederick Hayes-Roth It is certified that error appears in the above-identified patent and that said Letters Patent is hereby corrected as shown below:

In Column 1, line 56 change "permits" to "permit"
so that it reads ... that permit a requested meeting to be ....

In Column 6, line 16 change "HUA to decide" to "HUA decide"
so that it reads ... HUA decide, how the HUA is to ....

In Column 6, line 23 change "get together" to "get-together"
so that it reads ... requests to schedule a get-together ....

In Column 13, line 41 change "two people be able" to "two people will be able"
so that it reads ... said at least two people will be able to participate ....

In Column 13, line 59-60 change "digital assistant (PDA)" to "digital assistants (PDAs)"
so that it reads ... digital assistants (PDAs), and World Wide Web ....

Signed and Sealed this

First Day of September, 2009

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,552,393 B2 |
| APPLICATION NO. | : 10/642398 |
| DATED | : June 23, 2009 |
| INVENTOR(S) | : Frederick Hayes-Roth |

It is certified that error appears in the above-identified patent and that said Letters Patent is hereby corrected as shown below:

This certificate vacates the Certificate of Correction issued September 1, 2009. The certificate is a duplicate of the Certificate of Correction issued August 25, 2009. All requested changes were included in the Certificate of Correction issued August 25, 2009.

Signed and Sealed this

Thirteenth Day of October, 2009

David J. Kappos
*Director of the United States Patent and Trademark Office*